United States Patent
Peana

(10) Patent No.: US 11,837,146 B2
(45) Date of Patent: Dec. 5, 2023

(54) METHOD AND SYSTEM OF DIFFUSE AND SPECULAR REFLECTION CORRECTION OF DISPLAY DEVICE

(71) Applicant: Dell Products L.P., Round Rock, TX (US)

(72) Inventor: Stefan Peana, Austin, TX (US)

(73) Assignee: Dell Products L.P., Round Rock, TX (US)

(*) Notice: Subject to any disclaimer, the term of this patent is extended or adjusted under 35 U.S.C. 154(b) by 157 days.

(21) Appl. No.: 17/579,092

(22) Filed: Jan. 19, 2022

(65) Prior Publication Data
US 2023/0230523 A1 Jul. 20, 2023

(51) Int. Cl.
*G09G 3/20* (2006.01)
*G06T 5/00* (2006.01)
*G06T 5/20* (2006.01)

(52) U.S. Cl.
CPC .......... *G09G 3/2092* (2013.01); *G06T 5/003* (2013.01); *G06T 5/20* (2013.01); *G09G 2320/0295* (2013.01); *G09G 2320/066* (2013.01); *G09G 2360/144* (2013.01)

(58) Field of Classification Search
CPC ......... G09G 3/2092; G09G 2320/0295; G09G 2320/066; G09G 2360/144; G06T 5/003; G06T 5/20
See application file for complete search history.

(56) References Cited

U.S. PATENT DOCUMENTS

| | | | |
|---|---|---|---|
| 9,911,395 B1* | 3/2018 | Townsend | G09G 3/3406 |
| 10,636,125 B2* | 4/2020 | Morifuji | G06T 7/90 |
| 2013/0251288 A1* | 9/2013 | Kobiki | G06T 5/003 |
| | | | 382/298 |
| 2022/0044653 A1* | 2/2022 | Peana | G09G 3/3225 |

* cited by examiner

*Primary Examiner* — Antonio A Caschera
(74) *Attorney, Agent, or Firm* — Terrile, Cannatti & Chambers; Emmanuel A. Rivera

(57) ABSTRACT

Methods and a system for pixel-by-pixel correction of diffuse reflected and specular reflected light on a display device of an information handling system. Voltage values of pixels of the display device are measured by sensors. Measured voltage values of a pixel are converted to a digital value. A digital correction value calculated based on whether diffuse reflected light or diffuse reflected light and specular reflected light is found on the pixel. A sigmoid transfer function and discrete sharpening filter is performed on the pixel, if the digital correction value is less than zero.

19 Claims, 8 Drawing Sheets

METHOD AND SYSTEM OF DIFFUSE AND SPECULAR REFLECTION CORRECTION OF DISPLAY DEVICE

BACKGROUND OF THE INVENTION

Field of the Invention

The present invention relates to displays implemented by information handling systems. More specifically, embodiments of the invention provide for correcting diffuse and specular reflection using a pixel-by-pixel adjustment on a display device.

Description of the Related Art

As the value and use of information continues to increase, individuals and businesses seek additional ways to process and store information. One option available to users is information handling systems. Information handling systems include personal computers (PC), server computers, such as desktops. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Display devices or video displays can be implemented with information handling systems. For example, information handling systems configured as laptop computers can include an integrated display device. Image quality of display devices can be considered as a weighted combination of visually significant attributes of objects in an image. The viewing of an image on a display device, even with perfect image quality, can be disrupted/affected by environmental (i.e., external) light sources reflected on the screen surface of the display device. Such environmental light sources include a general uniform diffuse reflective light and a concentrated specular reflective light. Such reflective light sources are combined with the actual video light source (i.e., backlight) and affect image quality. The challenge is to reduce the effect of such environmental light sources, and provide clear image quality on the display device.

SUMMARY OF THE INVENTION

A computer-implementable method, system and computer-readable storage medium for pixel-by-pixel correction of diffuse reflected and specular reflected light on a display device of an information handling system comprising measuring voltage values of pixels of the display device; converting a measured voltage value of a pixel to a digital value; calculating a digital correction value based on whether diffuse reflected light or diffuse reflected light+specular reflected light is found on the pixel; determining if digital correction value is less than zero; and performing a sigmoid transfer function and discrete sharpening filter on the pixel, if the digital correction value is less than zero.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Implementations provide for ambient light sensor setup and calibration, where an ambient light sensor is associated with every pixel or particular group of pixels of a display device. Voltage value is recorded for the ambient light sensor at the same time another ambient light sensor measures diffuse and specular reflections for the pixel/pixel group. Calibration is performed to define a function to convert the sensor values to nits, and equivalent digital reflection value.

In instances, where a corrected digital reflection value is less than zero (0), pixel contrast is sharpened and enhanced to visually offset loss of contrast due to the environmental light reflections. Implementations provide for each pixel to be sharpened by running the pixel through a two-step process. The first step is applying sigmoidal transfer function to increase the gain between input and output pixel value. The second step is applying a discrete digital filter used to dynamically calculate the pixel local contrast relative to the neighboring pixels.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
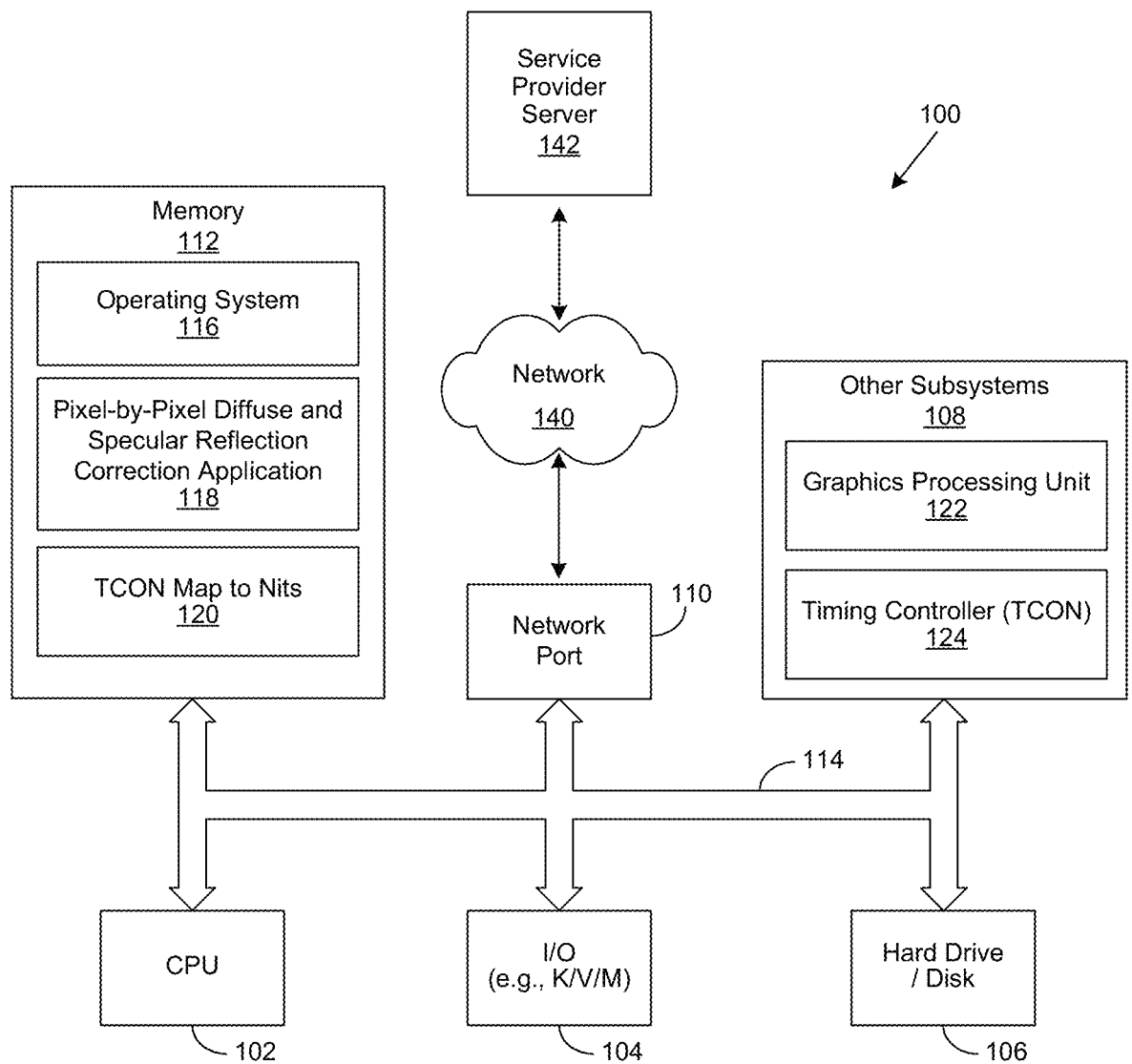
FIG. 1 is a general illustration of components of an information handling system as implemented in the present invention.

FIG. 1 is a generalized illustration of an information handling system 100 that can be used to implement the system and method of the present invention. The information handing system 100 can be a host to the peripheral devices described herein.

The information handling system 100 includes a processor (e.g., central processor unit or "CPU") 102, input/output (I/O) devices 104, such as a microphone, a keyboard, a video display or display device, a mouse, and associated controllers (e.g., K/V/M), a hard drive or disk storage 106, and various other subsystems 108. In various implementations, as further described herein, the video display of I/O devices 104 is calibrated and adjusted for image quality to address environmental light sources, such generalized diffuse reflected light and concentrated specular reflected light.

In various embodiments, the information handling system 100 also includes network port 110 operable to connect to a network 140, where network 140 can include one or more wired and wireless networks, including the Internet. Network 140 is likewise accessible by a service provider server 142.

The information handling system 100 likewise includes system memory 112, which is interconnected to the foregoing via one or more buses 114. System memory 112 can be implemented as hardware, firmware, software, or a combination of such. System memory 112 further includes an operating system (OS) 116. Embodiments provide for the system memory 112 to include one or more applications, such as pixel-by-pixel diffuse and specular reflection correction application 118 further described herein. System memory 112 can also include TCON (timing controller) map to nits 120 further described herein.

Various embodiments provide for other subsystems 108 to include a graphics processing unit or GPU 122 and a timing controller or TCON 124, which are further described herein.

Figure 2:
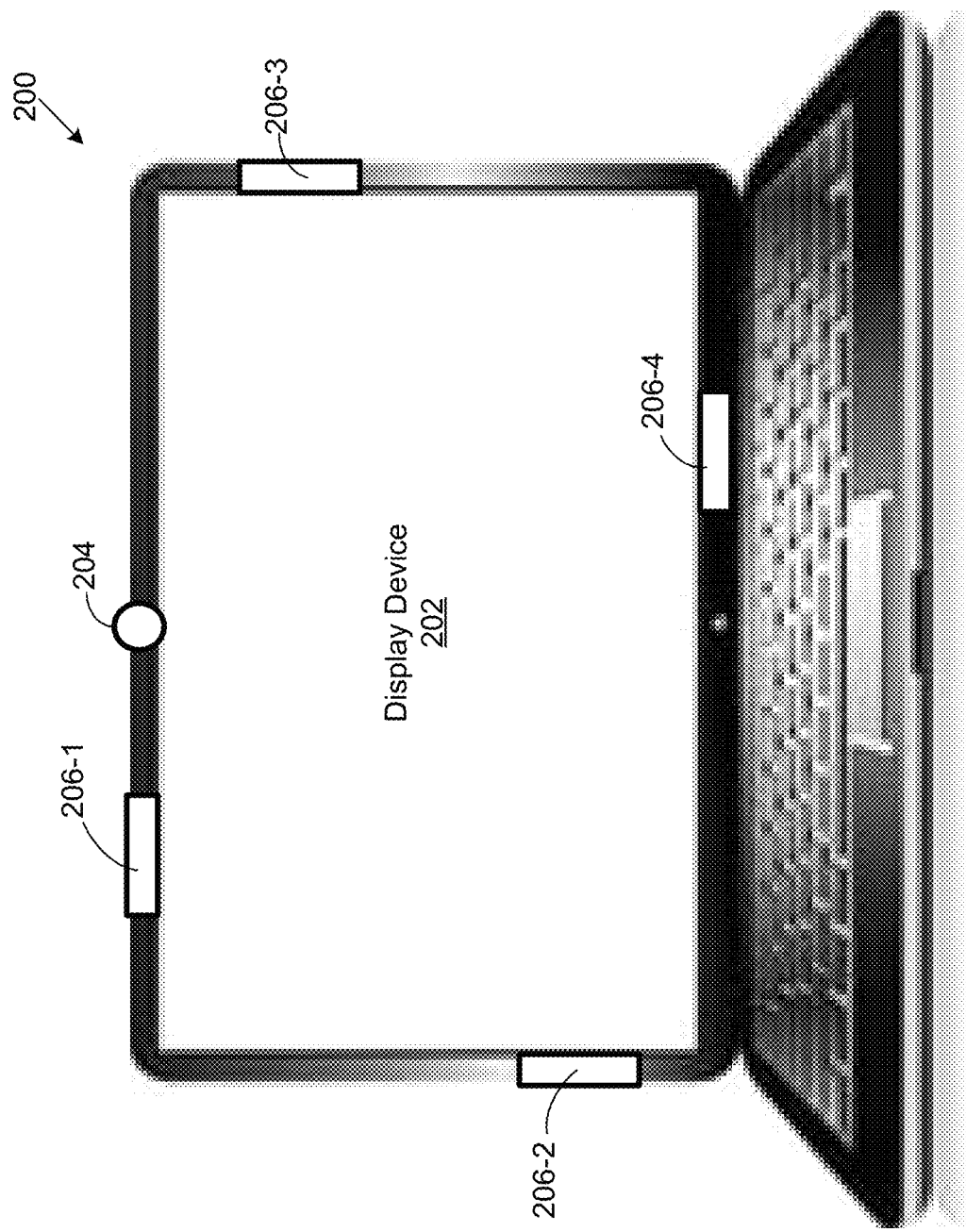
FIG. 2 illustrates a laptop computer with a display device that includes ambient light sensors as implemented in the present invention.

FIG. 2 shows a laptop computer 200 with a video display or display device 202 as implemented in the present invention. Laptop computer 200 can be implemented as an information handling system 100, and display device 202 as an input input/output (I/O) device 104 as described in FIG. 1

Various implementations provide for an integrated digital camera 204 as part of the laptop computer 200. The digital camera 204 can be an RGB camera used for various applications by the laptop computer 200, such as video conferencing, video and still image recording, etc. Digital camera 204 can configured as an optical sensor, and have a pixel map. Pixels of the pixel map of digital camera 204 can align or correspond with pixels of a pixel map of display device 202.

Implementations can include one or more ambient light sensors or ALS sensors 206-1, 206-2, 206-3 and 206-4. The ALS sensors 206 are photodetectors that sense the amount of ambient light that is present. In certain implementations, the ALS sensors 206 are placed along the edges of the display device 202 and read environmental illumination, such as general diffuse light sources and concentrated specular light sources on the surface of display device 202. The ALS sensors 206 can be configured to measure voltage values of areas (i.e., pixel/pixel groups) of the surface of display device 202.

In various implementations, ALS sensor 206-1 is an ALS edge sensor with an up-view aperture, ALS sensor 206-2 is an ALS edge sensor with a side-view aperture, ALS sensor 206-3 is an ALS edge sensor with a side-view aperture, and ALS sensor 206-4 is an ALS edge sensor with a down-view aperture.

Figure 3:
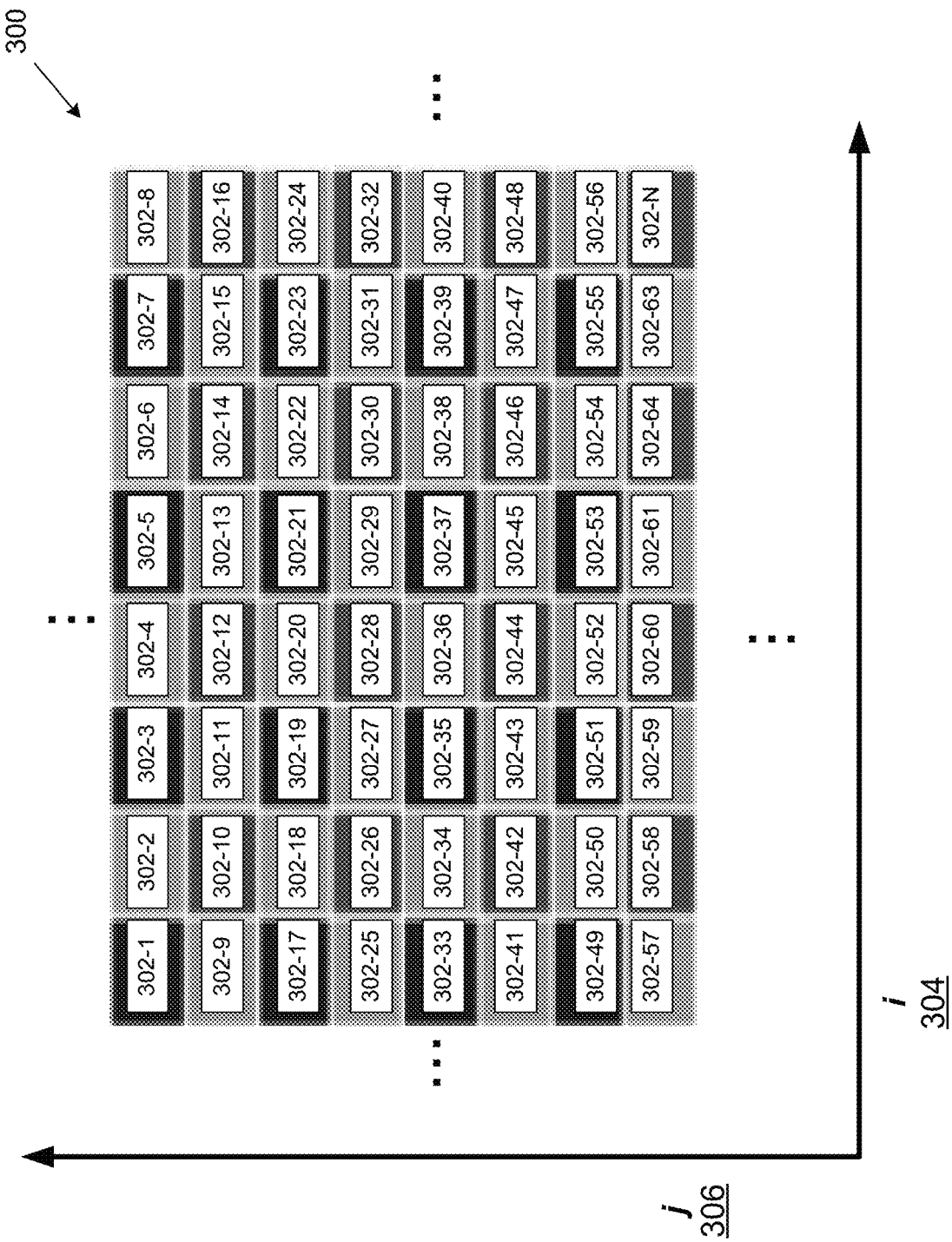
FIG. 3 illustrates a front view of pixels and pixel locations of display device as implemented in the present invention.

FIG. 3 shows a front view 300 of pixels 302 of a display device such as display device 202. The pixels 302 can be arranged in a particular format. An example of pixel arrangement can be an RGB pixel arrangement. The location of pixels 302 can be identified by "i" 304 and "j" 306 coordinates.

Implementations provide for the ALS sensors 206 to measure voltage at locations of pixels 302. In particular, implementations provide for sweep across the pixels, such as raster sweep, using to determine areas of generalized diffuse light and concentrated specular light, as further described herein. Furthermore, implementations provide for correcting the generalized diffuse reflected light and concentrated specular reflected light. The correcting provides for artificially correcting contrast at the identified pixel or pixel group. As further described, linear and/or sigmoidal function correction can be applied depending on the measured/calculated values of pixels or pixel groups.

As discussed, implementations provide for voltage values to be recorded for an ALS sensor 206 at the same time another ALS sensor 206 measures diffuse and specular reflections for a pixel 302 or pixel 302 group. Calibration is performed to define a function to convert the sensor values to nits, and equivalent digital reflection value. A nit is defined as one candela per square meter. Sensor values are converted to nit values. Sensor voltage values decrease with higher ambient nits due to photonic discharge.

Sensor (i.e., ALS sensor 206) values can be converted depending on whether diffuse reflected light or a combination of diffuse reflected and specular reflected light is measured. Conversion to nits for specular reflections can be different than for diffuse reflections. Furthermore, as described herein pixels 302 that are affected by diffuse and/or specular reflection are identified and are appropriately corrected for.

Figure 4:
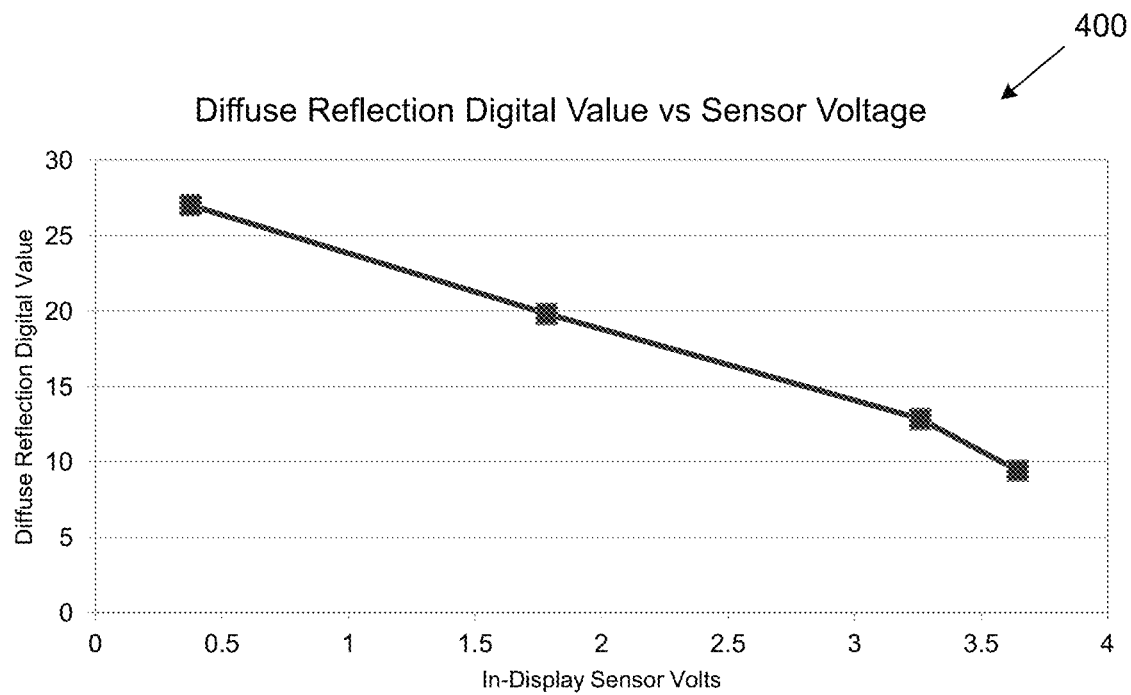
FIG. 4 illustrates a graph can for conversion of sensor values to digital values for diffuse reflected light.
Figure 5:
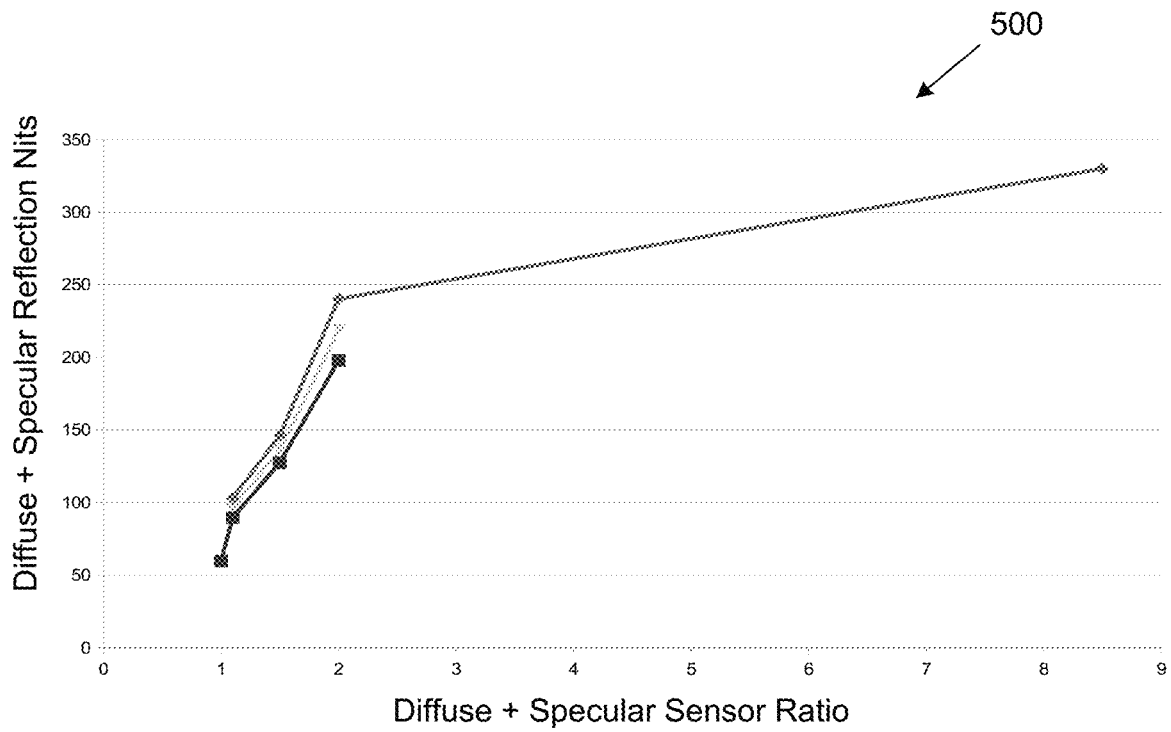
FIG. 5 illustrates a graph for correlating sensor values for diffuse reflected light and specular reflected light.

FIG. 4 shows a graph 400 that can used for conversion of ALS sensor 206 values to digital values diffuse reflected light. FIG. 5 shows a graph 500 that can be used for diffuse reflected light and specular reflected light.

Brighter specular reflected light can cause ALS sensors 206 to measure lower voltage values. Wherever specular reflected light is incident on the display device 202 there can be a band of lower sensor values as shown in graph 500. The ALS sensors 206 in a specular incident light band can also include incident light that is diffuse reflected light, such that the band represents specular and diffuse reflections.

The angular average of diffuse+specular sensor ratio (i.e., x axis of graph 500) of the diffuse sensor voltage values to the diffuse+specular sensor voltage values ($T=V_d/V_{s+d}$) can provide a conversion to diffuse+specular nits independent of the specular incident angle for low ratios less than 2.0 as seen in the middle band of graph 500. Higher ratios can occur for high incident angles. The upper high angle curve of graph 500 above a ratio of 2.0 can be used for conversion.

The following equation can be used to convert nit value to digital value:

$$\text{digital value} = a*(\text{nits})^{**1/p}$$

where p=the display power law often 2,2, and a=0.0010154 for a display maximum of 200 nits at d maximum=255.

If the reflected light digital value is less than the input digital value for a pixel, contrast correcting by subtraction can result in correcting the reflection for pixel 302. If the reflected light is larger than the input pixel value, this subtraction results in a digital value that is less than zero (0), which cannot be supported, since there is no blacker than "black" in current displays, and no negative light brightness.

In cases where the digital value is less than zero (0), the proposed approach is to sharpen and to enhance each pixel 302 contrast to help visually offset the loss of contrast due to the added ambient diffuse and specular light reflections. Each pixel 302 is sharpened by running the pixel through the following.

Figure 6:
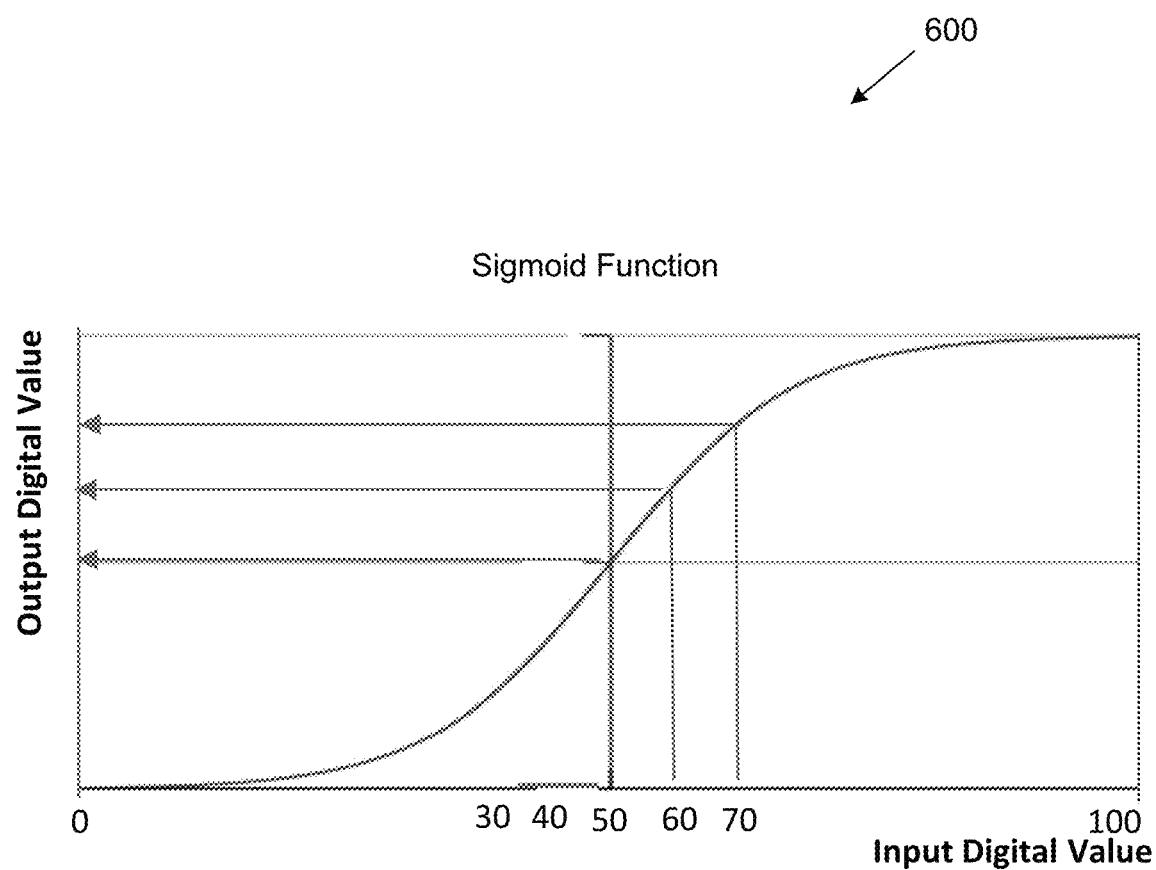
FIG. 6 illustrates a graph of a sigmoid(al) function.

For pixels 302 that are affected by specular light reflection, a sigmoidal transfer function can be used increase the gain between input and output pixel value. FIG. 6 shows a graph 600 of a sigmoid(al) function that can be used.

As further discussed herein, for specular light reflection, the sigmoid function correction is more appropriate than a linear correction. Correction or enhancement of pixel contrast provides for a sigmoidal shape having a different input to output ratio across the transfer function enabling a gain on input pixel differences such that the local pixel contrast is increased by 1+k, where for 10% gain k=0.1 and for 100% gain k=1.

In addition to correction using the sigmoid function, a discrete digital filter can be used to dynamically calculate the pixel local contrast relative to the neighboring pixels. Referring back to FIG. 3, for example, pixel 302-37 has pixel 302-29 as a neighbor at the top, pixel 302-45 as neighbor at the bottom, pixel 302-36 as a neighbor to the left, and pixel 302-38 as a neighbor to the right.

A discrete sharpening filter can be applied, where the example pixels can be considered as a 3×3 convolution kernel. For example, 302-37 is given a value of "4a+1", each of the neighboring pixels 302-9, 302-45, 302-36 and 302-38 are given a value of "−a".

For input pixels "P", a new sharpened pixel value "S" for the location (i, j) can be represented by the following equation:

$$S_{ij}=(4a+1)*P_{ij}-a*(P_{ij-1}+P_{ij+1}+P_{i-1j}+P_{i-1j-1})$$

For contrast enhancement using a gain on local pixel differences the processing is given by $P_{ij}$=pixel color value $A_{ij}$=average of pixel neighbor values=$(P_{ij-1}+P_{ij+1}+P_{i-1j}+P_{i-1j-1})/4$ $D_{ij}$=local pixel contrast $D_{ij}=(P_{ij}-A_{ij})$ $P'_{ij}$=new local pixel value $D'_{ij}$=new local pixel contrast k=pixel contrast gain factor Such that the following is calculated:

$P'_{ij}=P_{ij}+kD_{ij}$, and $D'ij=(P'ij-Aij)=Pij+kDij-Aij=Pij+k(Pij-Aij)-A ij=(1+k)(Pij-Aij)=(1+k)Dij$ In general, the discrete sharpening filter can be applied to a neighboring pixel to calculate a digital value. The digital value is used as an input for a sigmoid function to correct contrast. The output from the sigmoid function can be used for the next pixel using the discrete sharpening filter.

Figure 7:
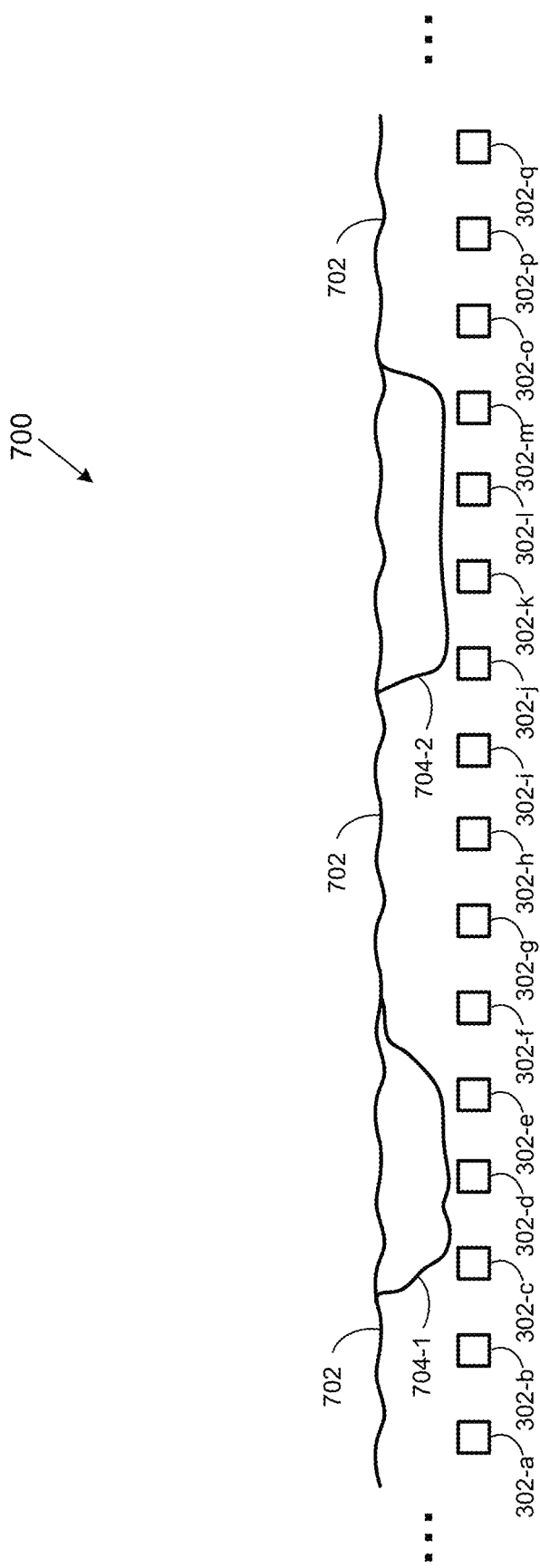
FIG. 7 illustrates a side view of pixels, and diffuse reflected light and specular reflected light.

FIG. 7 shows a side view 700 of pixels 302, and diffuse reflected light and specular reflected light. Diffuse reflected light is represented by curve 702. When measured by ALS sensors 206, the value of diffuse reflected light can be considered as the value $V_d$. As can be seen, diffuse reflected light is generally spread across the pixels 302, as seen by a relatively constant curve 702.

When specular reflected light is present and affects pixels, a "bump" is created. The combination of diffuse reflected light and specular reflected light is represented as bumps 704-1 and 704-2. In particular, bump 704-1 affects pixels 302-c, 302-d, 302-e, and 302-f. Bump 704-2 affects pixels 302-j, 302-k, 302-l, and 302-m. When measured by ALS sensors 206, the value of diffuse reflected light and specular reflected light can be considered as the value $V_{s+d}$.

Since diffuse reflected light is generally spread across pixels 302, and has a relative constant curve 702, contrast correction can be performed by a linear subtraction of the measured value or $V_d$ or the digital value of $V_d$. Specular reflected light as seen by the non-linear and curves 704 with changing values from pixel to pixel, uses a sigmoid function, such the sigmoid function of graph 600 of FIG. 6, for contrast correction as discussed above. In other words, contrast correction is performed non-linearly using the sigmoid function from edge to edge of curves 704.

Figure 8:
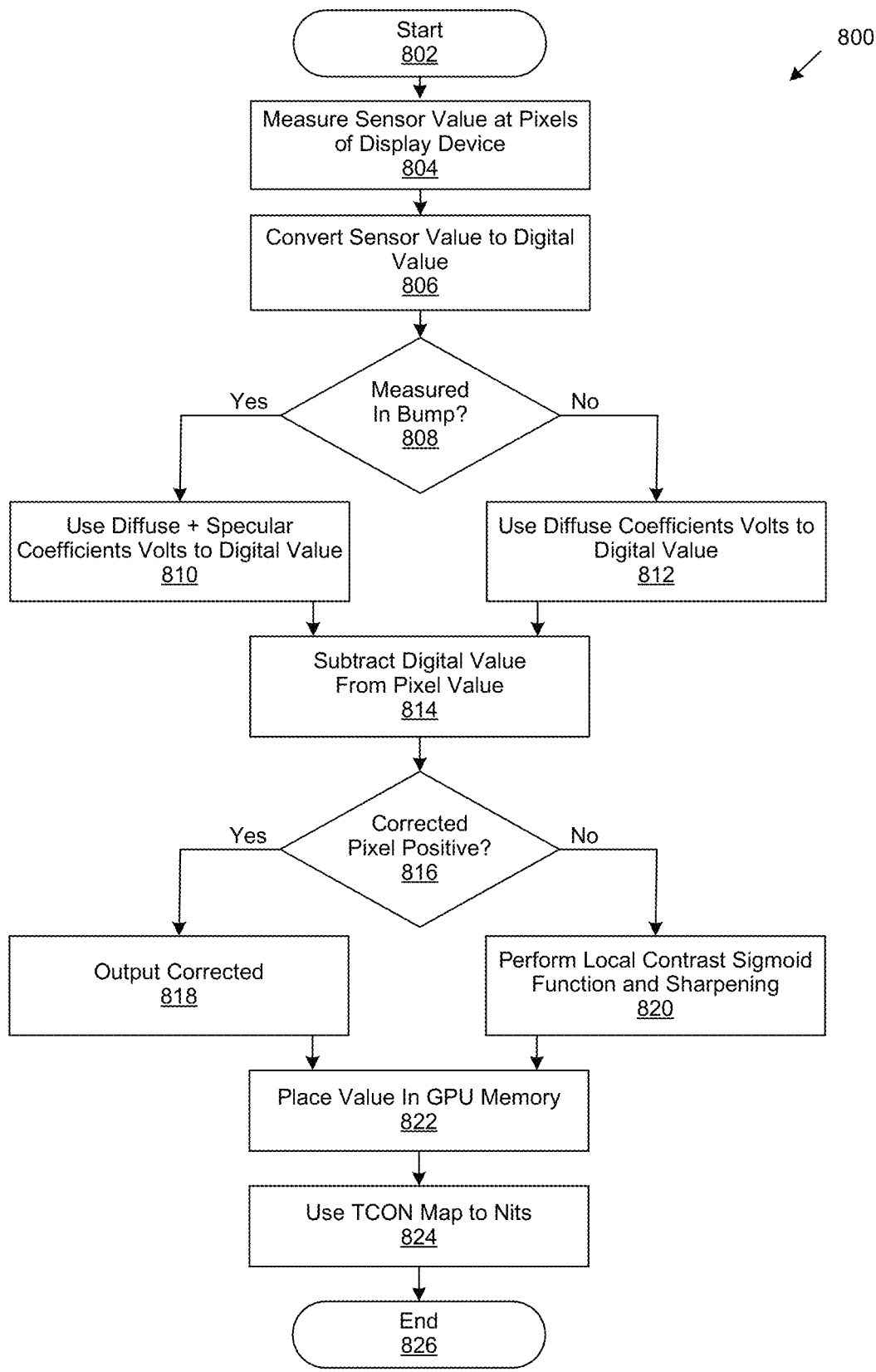
FIG. 8 is a generalized flowchart for correcting environmental light reflecting onto a display surface of a display device.

FIG. 8 shows a generalized flowchart for correcting environmental light reflecting onto a display surface of a display device. In various implementations, the steps of process 800 may be performed or initiated by the pixel-by-pixel diffuse and specular reflection correction application 118. Processing can be performed by the CPU 102, the GPU 122, TCON 124, digital signal processing unit and/or a combination of such.

The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 802, the process 800 starts. At step 804, values at pixels 302 are measured by ALS sensors 206. Implementations provide for a sweep across the pixels 302, such as raster sweep. At step 806, a conversion is performed from voltage measured by ALS sensors to a digital value for pixels 302.

At step 808, a determination is performed whether the pixel is in a bump, such as bump 704 described in FIG. 7. If the pixel is in a bump, following the "Yes" branch of step 808, then at step 810, diffuse+specular coefficients are used for the pixel 302. Volts are converted to digital value. Else, if the pixel is not in a bump, following the "No" branch of step 808, then at step 810, diffuse coefficients are use. Volts are converted to digital value. At step 814, the digital value at either step 810 or step 812 is subtracted from the digital value at step 806.

At step 816, a determination is performed as whether the corrected pixel value or the value at step 814 is positive. If the value is positive, following the "Yes" branch of step 816, at step 818 the output is corrected. Else, if the value is not positive, following the "No" branch of 816, at step 820 a local contrast sigmoid function is perform and discrete sharpening filter applied.

At step 822, the value is place in memory accessed by GPU 122. GPU 122 tasked to transform mathematical equations into individual pixels and frames. At step 824, the TCON Map to Nits 120 is used, where TCON 124 performs pixel contrast adjustment for the pixel 302 of the display device 202. TCON 124 takes the individual frames generated by the GPU 124, and corrects for color and brightness (i.e., contrast). At step 826, the process 800 ends.

Figure 9:
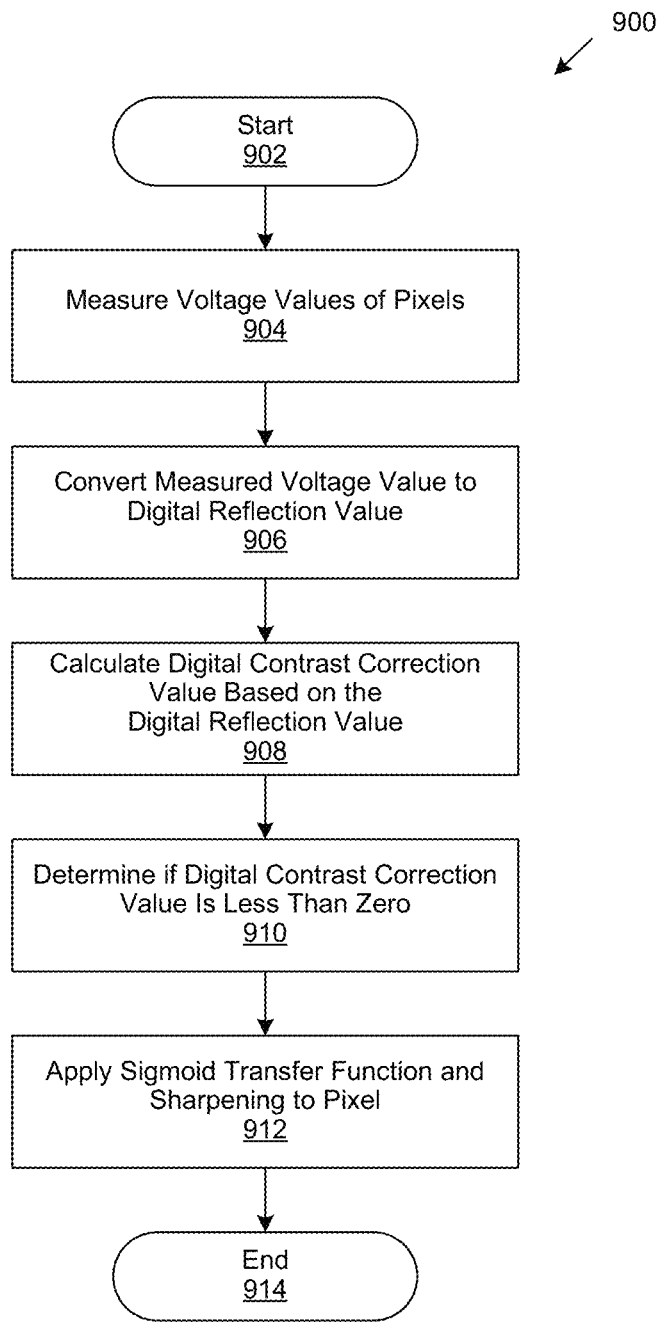
FIG. 9 is a generalized flowchart for pixel-by-pixel correction of diffuse reflected and specular reflected light on a display device.

FIG. 9 shows a generalized flowchart for pixel-by-pixel correction of diffuse reflected and specular reflected light on a display device. In various implementations, the steps of process 800 may be performed or initiated by the pixel-by-pixel diffuse and specular reflection correction application 118. Processing can be performed by the CPU 102, the GPU 122, TCON 124, digital signal processing unit and/or a combination of such.

The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 902, the process 900 starts. At step 904, voltage values of pixels 302 are measured by ALS sensors 206, where one or more of the ALS sensors can perform the measuring. At step 906, the measured voltage values are converted to digital values. The conversion can be based on whether diffuse reflected light or diffuse reflected light+ specular reflected light is detected.

At step 908, a digital contrast correction value is calculated based on the digital reflection value. At 910, a determination is performed as to whether the digital correction value is less than zero (0). At step 912, if the determination is made that the digital correction value is less than zero (0), a sigmoid transfer function and discrete sharpening filter is applied to the pixel. At step 914, the process 900 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for pixel-by-pixel correction of diffuse reflected and specular reflected light on a display device of an information handling system performed by at least one of a central processing unit, graphics processing unit, timing control unit and digital processing unit comprising:
   measuring voltage values of pixels of the display device;
   converting a measured voltage value of a pixel to a digital value;
   calculating a digital correction value based on whether diffuse reflected light or diffuse reflected light and specular reflected light is found on the pixel;
   determining if digital correction value is less than zero; and
   performing a sigmoid transfer function and discrete sharpening filter on the pixel, if the digital correction value is less than zero.

2. The computer-implementable method of claim 1, wherein the measuring is performed using a raster scan of the pixels of the display device.

3. The computer-implementable method of claim 1, wherein calculating the digital correction value is based on subtracting a reflected digital value from an input digital value of the pixel.

4. The computer-implementable method of claim 1, wherein calculating the digital correction value is linear subtraction of diffused reflected light, if only diffuse reflected light is found on the pixel.

5. The computer-implementable method of claim 1, wherein the sigmoid transfer function is used to increase gain between input and output pixel value.

6. The computer-implementable method of claim 1, wherein the discrete sharpening filter is applied on neighboring pixels.

7. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations for pixel-by-pixel correction of diffuse reflected and specular reflected light on a display device of an information handling system and comprising instructions executable by the processor and configured for:
   measuring voltage values of pixels of the display device;
   converting a measured voltage value of a pixel to a digital value;
   calculating a digital correction value based on whether diffuse reflected light or diffuse reflected light and specular reflected light is found on the pixel;
   determining if digital correction value is less than zero; and
   performing a sigmoid transfer function and discrete sharpening filter on the pixel, if the digital correction value is less than zero.

8. The system of claim 7, wherein the measuring is performed using a raster scan of the pixels of the display device.

9. The system of claim 7, wherein calculating the digital correction value is based on subtracting a reflected digital value from an input digital value of the pixel.

10. The system of claim 7, wherein calculating the digital correction value is linear subtraction of diffused reflected light, if only diffuse reflected light is found on the pixel.

11. The system of claim 7, wherein the sigmoid transfer function is used to increase gain between input and output pixel value.

12. The system of claim 7, wherein the discrete sharpening filter is applied on neighboring pixels.

13. The system of claim 7 wherein the steps are performed by at least one of a central processing unit, graphics processing unit, timing control unit and digital processing unit.

14. A non-transitory, computer-readable storage medium embodying computer program code, the computer program code comprising computer executable instructions configured for:
   measuring voltage values of pixels of the display device;
   converting a measured voltage value of a pixel to a digital value;
   calculating a digital correction value based on whether diffuse reflected light or diffuse reflected light and specular reflected light is found on the pixel;
   determining if digital correction value is less than zero; and
   performing a sigmoid transfer function and discrete sharpening filter on the pixel, if the digital correction value is less than zero.

15. The non-transitory, computer-readable storage medium of claim 14, wherein the measuring is performed using a raster scan of the pixels of the display device.

16. The non-transitory, computer-readable storage medium of claim 14, wherein calculating the digital correction value is based on subtracting a reflected digital value from an input digital value of the pixel.

17. The non-transitory, computer-readable storage medium of claim 14, wherein calculating the digital correction value is linear subtraction of diffused reflected light, if only diffuse reflected light is found on the pixel.

18. The non-transitory, computer-readable storage medium of claim 14, wherein the sigmoid transfer function is used to increase gain between input and output pixel value.

19. The non-transitory, computer-readable storage medium of claim 14 wherein the discrete sharpening filter is applied on neighboring pixels.

* * * * *